P. HANSMANN.
SIDEHILL PLOW.
APPLICATION FILED DEC. 22, 1920.

1,409,712.

Patented Mar. 14, 1922.
2 SHEETS—SHEET 1.

Inventor,
Paul Hansmann
by H. S. Johnson
his Attorney.

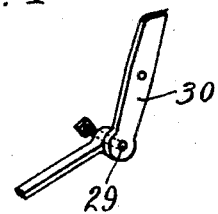
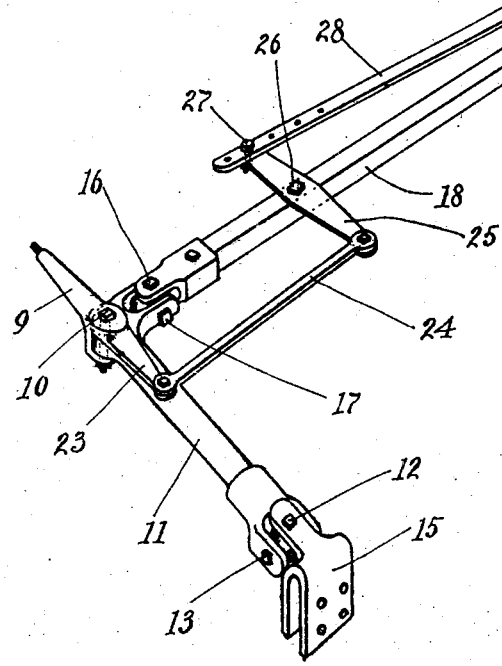
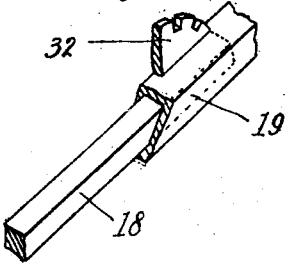

UNITED STATES PATENT OFFICE.

PAUL HANSMANN, OF LONG PRAIRIE, MINNESOTA.

SIDEHILL PLOW.

1,409,712.  Specification of Letters Patent.  Patented Mar. 14, 1922.

Application filed December 22, 1920. Serial No. 432,579.

*To all whom it may concern:*

Be it known that I, PAUL HANSMANN, a citizen of the United States, residing at Long Prairie, in the county of Todd and State of Minnesota, have invented certain new and useful Improvements in Sidehill Plows, of which the following is a specification.

My invention relates to improvements in side hill plows, my object being particularly to provide means for resisting the tendency of the plow to travel down the hill and thus cause the plow to cut a straight furrow along the side of the hill.

To this end the invention consists in the features of construction, combination and arrangement of parts hereinafter described and claimed.

In the accompanying drawings forming a part of this specification,

Figure 3 is a plan view of an adjusting mechanism forming part of my invention; and Figures 4 and 5 are details of part of the adjusting mechanism shown in Figure 3.

Figure 1:
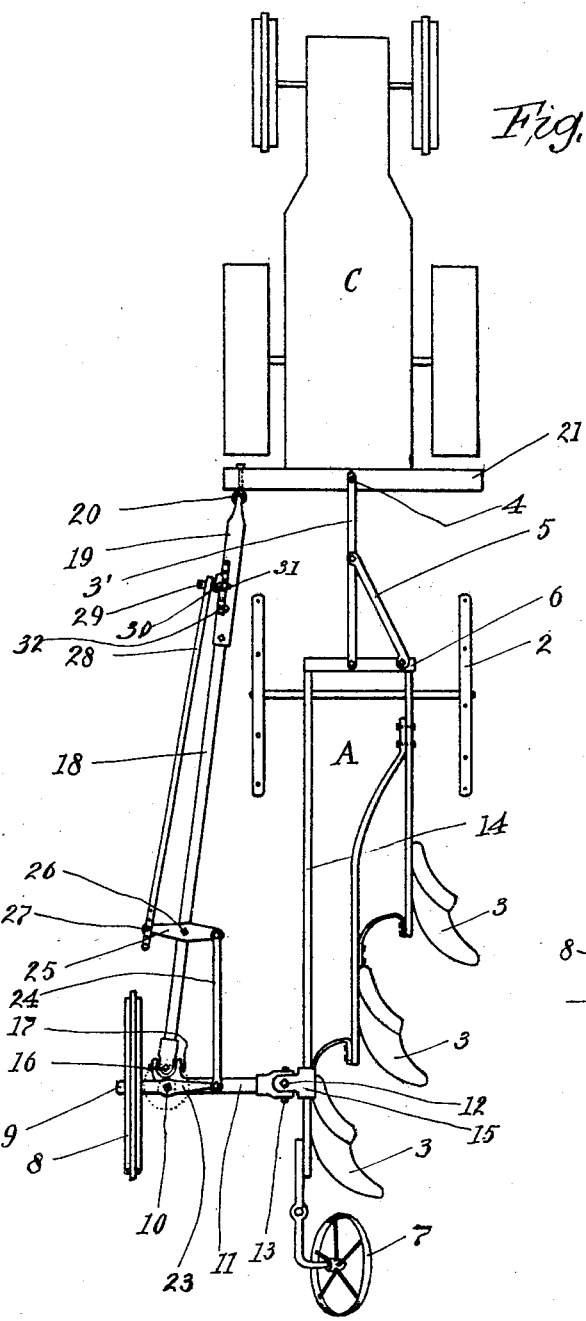
Figure 1 is a plan view of a gang plow fitted with my features of invention.
Figure 2:
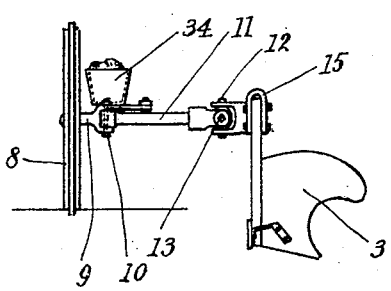
Figure 2 is a rear elevation with the trailer removed.

Referring to the drawings, A represents the frame of a gang plow mounted upon wheels 2 and supporting in a desired manner the usual plow shares 3. C represents a tractor of any desired construction for pulling the plow, the plow frame being connected with the draft beam of the tractor as by means of a bar 3' projecting forwardly from the plow and having pivotal connection 4 with the tractor. The bar 3' is shown braced by an arm 5 connecting it with the crossbar 6 of the plow frame. 7 represents a trailer of ordinary type journaled upon the rear of the plow frame.

My invention consists of a rudder 8 preferably in the form of a wheel journaled upon a stub axle 9, the inner end of the stub axle having pivotal connection 10 with the outer end of a shaft 11. The shaft 11 at its inner end has vertical and horizontal pivotal connections 12 and 13 with the horizontal bar 14 of the plow frame, preferably through the medium of a bracket 15 secured over said bar 14.

For the purpose of adjusting the angle of the rudder wheel with reference to the plow frame, I provide the following adjusting mechanism: Having vertical and horizontal pivotal connections 16 and 17 at the outer end of the shaft 11 is a bar telescoping at its forward end in a sleeve member 19, which sleeve member at its forward end has pivotal connection 20 with the outer end of the rear crossbar 21 of the tractor. The members 18 and 19 constitute a connecting bar between the outer end of the shaft 11 and the draft beam of the tractor and are adapted to be adjusted in length by the medium of the pin connection 22. Thus the position of the shaft 11 relative to the draft beam may be changed. Projecting inwardly from the stub axle is an arm 23 pivotally connected at its free end by a link 24 with a rocker arm 25, which rocker arm has pivotal support 26 upon the bar 18. The opposite end of the rocker arm has adjustable connection 27 with one end of a bar 28, the other end of the bar having pivotal connection 29 with a lever arm 30. The hand lever 30 has pivotal support 31 upon the toothed segment 32 projecting upwardly from the bar member 19. The hand lever 30 slidably supports a spring pressed bar 33 adapted to work in the usual manner in connection with the teeth of the segment. The motion imparted to the rudder by the actuation of the hand lever 30 is not always adequate on steep grades to turn the rudder sufficiently to be effective. To effect a further turning of the wheel the pin adjustment 27 is provided whereby when the connecting bar 28 is lengthened the relation of the stub axle 9 to the shaft 11 will be changed, thereby pointing the rudder further uphill.

For the purpose of holding the rudder wheel pressed into the ground I preferably employ a weight, as the weighted box 34, supported upon the stub axle.

In operation, the plow will be pulled alongside of the hill by the tractor with the rudder 8 traveling upon the up side of the hill. With the rudder set to point up the hill, the tendency will be to pull the plow shares up, overcoming the natural tendency of the plow shares to travel down the hill. The pull on the rudder may be increased or decreased by a change in the angle thereof with reference to the plow frame, through the medium of the adjusting mechanism actuated through the hand lever 30. As will be evident, a movement of the hand lever 30 will turn the rocker arm 25 and through the connected link 24 turn the stub axle to adjust the angle of the rudder. While I have shown a wheel acting as a rudder, I may use some equivalent construction as a slide rudder to accomplish the same purpose. Also, if desired, I may in operation use the rudder upon the down side of the hill to exert a thrust against the plow shares instead of using it upon the up side to exert a pull.

I claim:

1. The combination of an implement frame, a draft beam connected thereto, a bar pivoted to the frame and extending laterally thereof, a rudder pivotally supported on the outer end of said bar, a connecting member between the draft beam and the outer end of the bar comprising two adjustably connected sections, and means on the section attached to the draft beam for adjusting the rudder on its pivot.

2. A side hill plow comprising a frame having a draft beam, a laterally extending bar universally connected to the frame, a two-part connecting member between the outer end of the bar and the draft beam, said member being lengthwise adjustable, a stub shaft pivoted to the outer end of the bar, a rudder wheel journaled on the shaft, a cross lever pivoted between its ends on the part of the member connected directly to the bar, a link connecting one end of the lever to the shaft, and means carried by the other part of the connecting member and joined to the opposite end of the lever for rocking the same to effect adjustment of the rudder wheel.

3. In combination with a plow carrying frame, of a draft beam, of an outwardly extending shaft pivotally supported on said frame, a rudder pivotally supported on the outer end of said shaft, a two-part extensible connection between said shaft and said draft beam, and means connected with said two parts of the extensible connection for controlling the movement of said rudder upon its pivot, said means being connected in a manner with said extensible connection to effect a change in the relation of said controlling means to the rudder when said connection is extended.

In testimony whereof I affix my signature.

PAUL HANSMANN.